United States Patent [19]

Okuyama et al.

[11] Patent Number: 4,629,959
[45] Date of Patent: Dec. 16, 1986

[54] METHOD AND APPARATUS FOR CONTROLLING PWM INVERTER

[75] Inventors: Toshiaki Okuyama, Ibaraki; Hiroshi Nagase, Hitachi, both of Japan

[73] Assignee: Hitachi, Ltd., Tokyo, Japan

[21] Appl. No.: 766,686

[22] Filed: Aug. 19, 1985

Related U.S. Application Data

[63] Continuation of Ser. No. 528,149, Aug. 31, 1983, abandoned.

[30] Foreign Application Priority Data

Sep. 3, 1982 [JP] Japan ................... 57-152622

[51] Int. Cl.⁴ .............................................. H02P 7/42
[52] U.S. Cl. ..................................... 318/727; 318/802
[58] Field of Search .................... 318/727, 798–811, 318/720–723

[56] References Cited

U.S. PATENT DOCUMENTS

| | | | |
|---|---|---|---|
| 4,227,138 | 10/1980 | Espelage et al. | 318/802 |
| 4,230,974 | 10/1980 | Espelage et al. | 318/802 |
| 4,314,190 | 2/1982 | Walker et al. | 318/798 |
| 4,314,191 | 2/1982 | Kawada et al. | 318/802 |
| 4,320,331 | 3/1982 | Plunkett | 318/802 |
| 4,376,894 | 3/1983 | Vogler | 318/727 |

Primary Examiner—Arthur G. Evans
Attorney, Agent, or Firm—Antonelli, Terry & Wands

[57] ABSTRACT

An induction motor is driven by a PWM inverter including switching elements such as gate turn-off thyristors of Graetz connection. Turn-on of the PWM inverter is controlled by PWM pulse signals generated from a pulse width modulator. The pulse width modulator includes comparators having a hysteresis characteristic which generate the PWM pulse signals on the basis of the magnitude and polarity of current errors between current command pattern signals and signals indicative of detected output currents of the PWM inverter. A signal generator generates an AC signal which is applied to the comparators so that the PWM pulse signals generated from the comparators act to increase the effective value of the neutral voltage of the output of the PWM inverter.

8 Claims, 14 Drawing Figures

METHOD AND APPARATUS FOR CONTROLLING PWM INVERTER This application is a continuation of application Ser. No. 528,149, filed Aug. 31, 1983, now abandoned.

BACKGROUND OF THE INVENTION

This invention relates to a method and apparatus for controlling a PWM (pulse width modulation) inverter, in which higher harmonic components included in the output currents of the PWM inverter driving an AC motor are reduced so as to reduce magnetic noise (acoustic noise) generated from the AC motor.

An instantaneous-value control system and a mean-value control system are generally used for the control of a PWM inverter. According to the instantaneous-value control system, turn-on control of the PWM inverter is made by PWM pulse which is modulated on the basis of differences of magnitude and polarity between a current command pattern signal (a sinusoidal wave signal), and a detected current signal at the inverter output. This instantaneous-value control system is advantageous over the mean-value control system. In the mean value control system, a voltage command pattern signal is used as a modulation signal and is compared with a carrier wave signal (a triangular wave signal) to generate a PWM pulse signal for each phase. The current control response of the former system is better than that of the latter system. Practical applications of the instantaneous-value control system having such an advantage to the control of PWM inverters have been attempted in recent years in this field, and some of the attempts have been proved successful and put into practical use.

It is commonly known that an AC motor driven by a PWM inverter generates magnetic noise (accoustic sound). Such magnetic noise is generated from the AC motor for the reason that higher harmonic components are included in the output currents of the PWM inverter. Especially, when the instantaneous-value control system is used for the control of the PWM inverter, magnetic noise giving a feeling of discomfort is generated from the AC motor during rotation of the motor in a low-speed range.

On the other hand, such an AC motor is now frequently installed not only in a place of high noise level but also in a place of low noise level. Even when an AC motor driven by a PWM inverter is installed in a place of high noise level, generation of noise giving a feeling of discomfort is not desirable in view of the working circumstance. It is therefore strongly demanded to reduce the undesirable magnetic noise generated from the AC motor driven by the PWM inverter.

Various methods have been proposed hitherto for reducing the magnetic noise generated from an induction motor driven by a PWM inverter. In one of the known methods, the magnetic flux produced in the induction motor is weakened in a light-loaded or no-loaded operating condition of the induction motor, and, in another known method, both of the instantaneous-value control system and the mean-value control system are incorporated to be switched over between each other depending on the rotation speed of the induction motor, as described in, for example, the following documents:

(A) Japanese Patent Application Laid-open No. 56-83284 (1981) entitled "Apparatus for variable-speed operation of induction motor". The document (A) describes that, when an induction motor is driven by a PWM inverter, the magnetic flux produced in the induction motor is weakened in a light-loaded or no-loaded operating condition of the motor so as to reduce magnetic noise generated from the motor.

(B) Japanese Patent Application Laid-open No. 56-117577 (1981) entitled "Inverter control apparatus". The document (B) describes that, when an induction motor is driven by a PWM inverter, the mean value of the inverter output currents is controlled in a low frequency range of the inverter output, while the instantaneous value of the inverter output currents is controlled in a high frequency range of the inverter output, so as to reduce magnetic noise generated from the motor during rotation in its low-speed range.

However, the former proposal is defective in that magnetic noise cannot be reduced in the rated-load operating condition of the motor when the magnetic flux density attains its rating, although such magnetic noise can successfully be reduced in the no-loaded (or light-loaded) operating condition of the motor. Also, the latter proposal is defective in that the current control response is lowered in the operation range (the low-speed operation range) controlled by the mean-value control system, and that a torque variation occurs at the time of switch-over between the control systems.

BRIEF SUMMARY OF THE INVENTION

With a view to obviate the prior art defects pointed out above, it is a primary object of the present invention to provide a method and apparatus for controlling a PWM inverter, which can reduce undesirable magnetic noise generated from an AC motor driven by the PWM inverter, without giving rise to an undesirable degradation of the current control response and an undesirable torque variation and regardless of the loaded condition of the AC motor.

In accordance with one aspect of the present invention, there is provided a method for controlling a PWM inverter which drives an AC motor and which is turned on under control of pulse width modulation means comparing a detected current signal with a current command pattern signal for each of the individual phases to find a current error in each phase, and, on the basis of the magnitude and polarity of the current error, generating a PWM pulse signal for each phase, the method comprising applying an AC signal from signal generating means to the pulse width modulation means so that the PWM pulse signals generated from the pulse width modulation means act to increase the effective value of the neutral voltage of the output of the PWM inverter.

In accordance with another aspect of the present invention, there is provided a PWM inverter control apparatus comprising a PWM inverter driving an AC motor, current command means generating current command pattern signals for commanding output currents of the PWM inverter in the individual phases, current detection means detecting the output currents of the PWM inverter, pulse width modulation means for generating PWM pulse signals based on the magnitude and polarity of current errors between the current command pattern signals and the detected current signals of the individual phases, and signal generating means for generating an AC signal and applying it to the pulse width modulation means so that the PWM pulse signals generated from the pulse width modulation means act to increase the effective value of the neutral voltage of the output of the PWM inverter.

Other objects, features and advantages of the present invention will become apparent from the following detailed description of preferred embodiments thereof taken in conjunction with the accompanying drawings, in which:

BRIEF SUMMARY OF THE DRAWINGS

FIG. 1 shows an embodiment of the present invention.

DETAILED DESCRIPTION OF THE PREFERRED EMBODIMENTS

Figure 1:
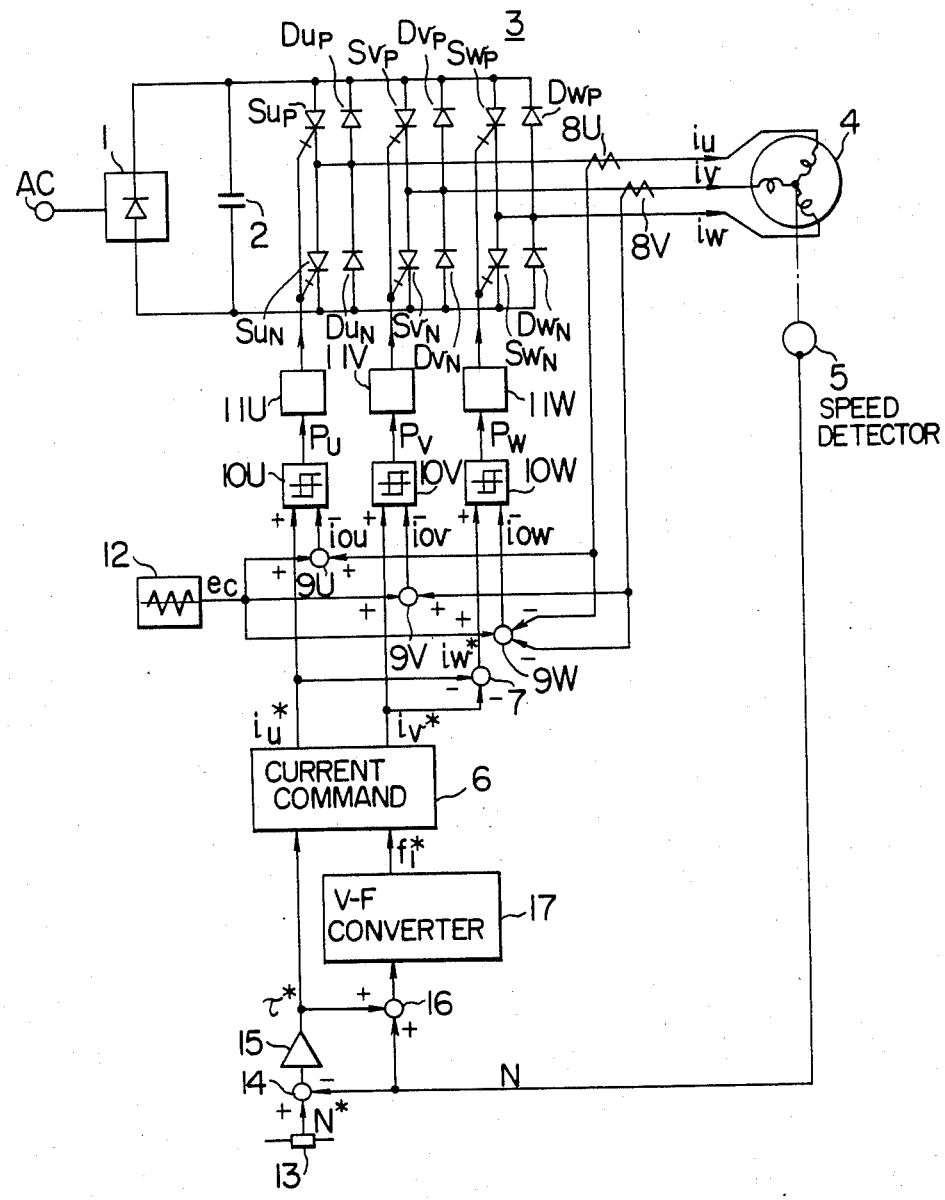
FIG. 1 is a circuit diagram showing the structure of an embodiment of the present invention.

Referring to FIG. 1, an AC voltage applied from a commercial AC power source AC is converted into a DC voltage by a diode rectifier circuit 1. The DC voltage from the rectifier circuit 1 is applied to a PWM inverter 3 after being smoothed by a smoothing capacitor 2. The PWM inverter 3 includes self-extinguish elements $S_{up}$, $S_{vp}$, ..., $S_{WN}$ of Graetz connection and feedback diodes $D_{up}$, $D_{VP}$, ..., $D_{WN}$ connected in inverse-parallel relation to the associated self-extinguish elements respectively. These self-extinguish elements are switching elements such as gate turn-off thyristors or transistors.

An induction motor 4 is connected at its input terminals to the U-phase, V-phase and W-phase AC output terminals of the PWM inverter 3. A speed detector 5 is mechanically coupled to the induction motor 4. The U-phase and V-phase primary currents $i_U$ and $i_V$ (the output currents of the inverter 3) supplied to the induction motor 4 are detected by current detectors 8U and 8V respectively. Signals indicative of the currents $i_U$ and $i_V$ detected by the current detectors 8U and 8V are applied in illustrated polarity to adders 9U and 9V respectively and are also applied in illustrated polarity to another adder 9W which generates a signal indicative of the detected W-phase primary current $i_W$ of the induction motor 4.

A speed command signal N* from a speed command circuit 13 and a detected speed signal N from the speed detector 5 are compared in illustrated polarities in a comparator 14, and the comparator output signal indicative of the speed error ΔN is amplified by a speed error amplifier 15. The output signal from the speed error amplifier 15 is applied as a torque command signal τ* to a current command circuit 6 and to an adder 16. A voltage-frequency (V-F) converter 17 generates a frequency command signal $f_1^*$ proportional to the sum of the rotation frequency proportional to the detected speed signal N and the slip frequency proportional to the torque command signal τ*. The frequency command signal $f_1^*$ determines the output frequency of the PWM inverter 3 (the primary frequency of the induction motor 4). The current command circuit 6 generates current command pattern signals $i_U^*$ and $i_V^*$ which have an amplitude proportional to the value of the torque command signal τ*, a frequency proportional to the value of the frequency command signal $f_1^*$ and a phase difference of 120°. The current command pattern signals $i_U^*$ and $i_V^*$ are applied to comparators 10U and 10V having a hysteresis characteristic respectively. Also, these two current command signals $i_U^*$ and $i_V^*$ are added in illustrated polarity in an adder 7 to be subjected to vector addition. The adder 7 generates a W-phase current command pattern signal $i_W^*$ which is applied to a comparator 10W having a hysteresis characteristic.

A signal generator 12 generates an AC signal $e_c$ of triangular waveform which is applied in illustrated polarity to the adders 9U, 9V and 9W. The comparators 10U, 10V and 10W compare the output signals $i_{OU}$, $i_{OV}$ and $i_{OW}$ from the adders 9U, 9V and 9W with the current command pattern signals $i_U^*$, $i_V^*$ and $i_W^*$ respectively generate pulse width modulation (PWM) pulse signals $P_U$, $P_V$ and $P_W$ for turning on/off the switching element $S_{UP}$, $S_{VP}$, ..., $S_{WN}$ constituting the PWM inverter 3. In response to the PWM pulse signals $P_U$, $P_V$ and $P_W$ generated from the respective comparators 10U, 10V and 10W, gate circuits 11U, 11V and 11W apply gate signals to the switching elements $S_{UP}$, $S_{VP}$, ..., $S_{WN}$.

The operation of the embodiment shown in FIG. 1 will now be described with reference to FIGS. 2 and 3. The signals shown in FIGS. 2(e) to 2(g) are the same as those shown in FIGS. 3(e) to 3(g) respectively.

For facilitating the understanding of the present invention, description will be first directed to a period $T_1$ in which the AC signal $e_c$ of triangular waveform is not applied from the signal generator 12 to the adders 9U, 9V and 9W.

It is supposed herein that the output currents $i_U$, $i_V$ and $i_W$ of the PWM inverter 3 have a positive polarity when they flow in the direction shown by the arrows in FIG. 1. The currents $i_U$, $i_V$ and $i_W$ increase in the positive direction when the switching elements $S_{UP}$, $S_{VP}$ and $S_{WP}$ are turned on, but increase in the negative direction when the switching elements $S_{UN}$, $S_{VN}$ and $S_{WN}$ are turned on. Further, the currents $i_U$, $i_V$ and $i_W$ of positive polarity decrease by flowing through the diodes $D_{UN}$, $D_{VN}$ and $D_{WN}$ when the switching elements $S_{UP}$, $S_{VP}$ and $S_{WP}$ are turned off respectively, and the currents $i_U$, $i_V$ and $i_W$ of negative polarity decrease by flowing through the diodes $D_{UP}$, $D_{VP}$ and $D_{WN}$ when the switching elements $S_{UN}$, $S_{VN}$ and $S_{WN}$ are turned off respectively.

The switching elements $S_{UP}$, $S_{VP}$, ..., $S_{WN}$ are turned on/off by the PWM pulse signals $P_U$, $P_V$ and $P_W$ generated from the comparators 10U, 10V and 10W. The relation between the current command pattern signal $i_U^*$ and the detected current signal $i_U$ (the output signal $i_{OU}$ of the adder 9U) applied to the comparator 10U is shown in FIG. 2(a). When the current error $\Delta i_U$ ($\Delta i_U < 0$) between the current command pattern signal $i_U^*$ and the detected current signal $i_U$ has the relation $|\Delta i_U| > |\Delta I|$ between it and a hysteresis deviation $-\Delta I$ in the period $T_1$, the PWM pulse signal $P_U$ of "1" level appears from the comparator 10U as shown in FIG. 2(e). In response to the application of the PWM pulse signal of "1" level, the gate circuit 11U applies the gate signal to the switching element $S_{UP}$. Since the polarity of the U-phase current $i_U$ in the period $T_1$ is positive, the U-phase current $i_U$ increases when the switching element $S_{UP}$ is turned on. When the U-phase current $i_U$ increases until its level exceeds the current command pattern signal $i_U^*$ by more than a hysteresis deviation $+\Delta I$, the PWM pulse signal $P_U$ generated from the comparator 10U is turned into its "−1" level. As soon as the PWM pulse signal $P_U$ is turned into the "−1" level, the gate circuit 11U applies now the gate signal to the switching element $S_{UN}$. At this time, the switching element $S_{UP}$ is turned off.

The polarity of the U-phase current $i_U$ in the period $T_1$ is positive. Therefore, when the switching element $S_{UP}$ is turned off, the U-phase current $i_U$ decreases by flowing through the diode $D_{UN}$. When the U-phase current $i_U$ decreases until its level becomes lower than the current command pattern signal $i_U^*$ by the hysteresis deviation $-\Delta I$, the PWM pulse signal $P_U$ of "1" level is generated from the comparator 10U again, and the aforementioned operation is repeated. The U-phase current $i_U$ flows through the switching element $S_{UN}$ and diode $D_{UP}$ when the polarity of this current $i_U$ is negative.

In the manner above described, the U-phase current $i_U$ of the PWM inverter 3 is controlled to follow the pattern provided by the current command pattern signal $i_U^*$. It is apparent that the V-phase current $i_V$ and W-phase current $i_W$ of the PWM inverter 3 are also similarly controlled by the PWM pulse signals $P_V$ and $P_W$ generated from the respective comparators 10V and 10W. The relation between the V-phase current command pattern signal $i_V^*$ and the V-phase current $i_V$ is shown in FIG. 2(b), and the PWM pulse signal $P_V$ generated from the comparator 10V is shown in FIG. 2(f). Similarly, the relation between the W-phase current command pattern signal $i_W^*$ and the W-phase current $i_W$ is shown in FIG. 2(c), and the PWM pulse signal $P_W$ generated from the comparator 10W is shown in FIG. 2(g).

The instantaneous-value control of the PWM inverter 3 is carried out in the manner above described. That is, the instantaneous-value control of the PWM inverter 3 is such that the instantaneous values of the output currents $i_U$, $i_V$ and $i_W$ are detected and compared with the current command pattern signals $i_U^*$, $i_V^*$ and $i_W^*$ respectively for switching the required switching elements in the PWM inverter 3 depending on the results of comparison. Thus, the output currents $i_U$, $i_V$ and $i_W$ of the PWM inverter 3 can be controlled with a high response.

Since the PWM inverter 3 is on-off controlled by the PWM pulse signals $P_U$, $P_V$ and $P_W$ in the manner above described, its output voltages (phase voltages) change in synchronism with the PWM pulse signals $P_U$, $P_V$ and $P_W$.

Figure 2:
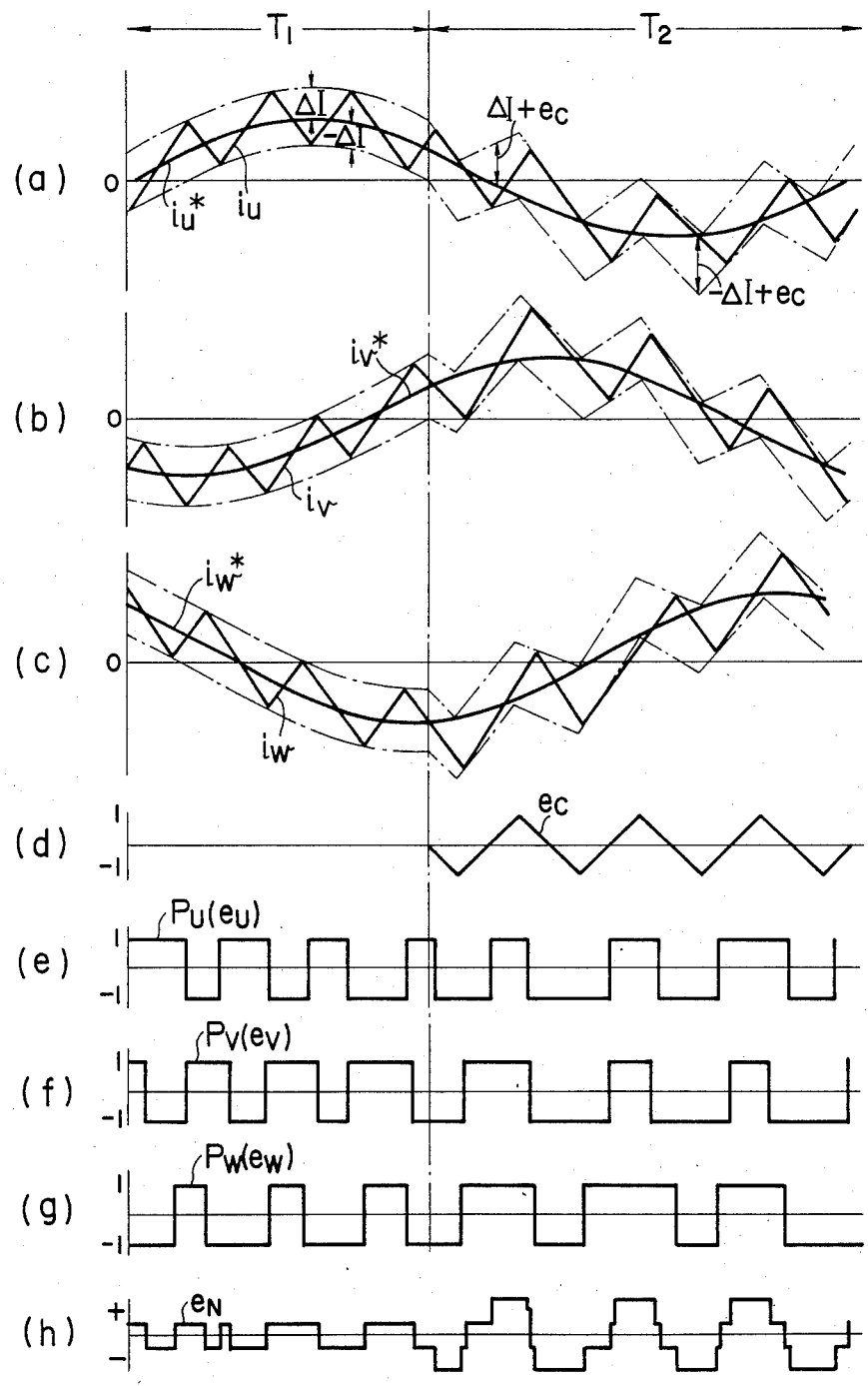
FIGS. 2 and 3 are waveform diagrams illustrating the operation of the embodiment shown in FIG. 1.
Figure 3:
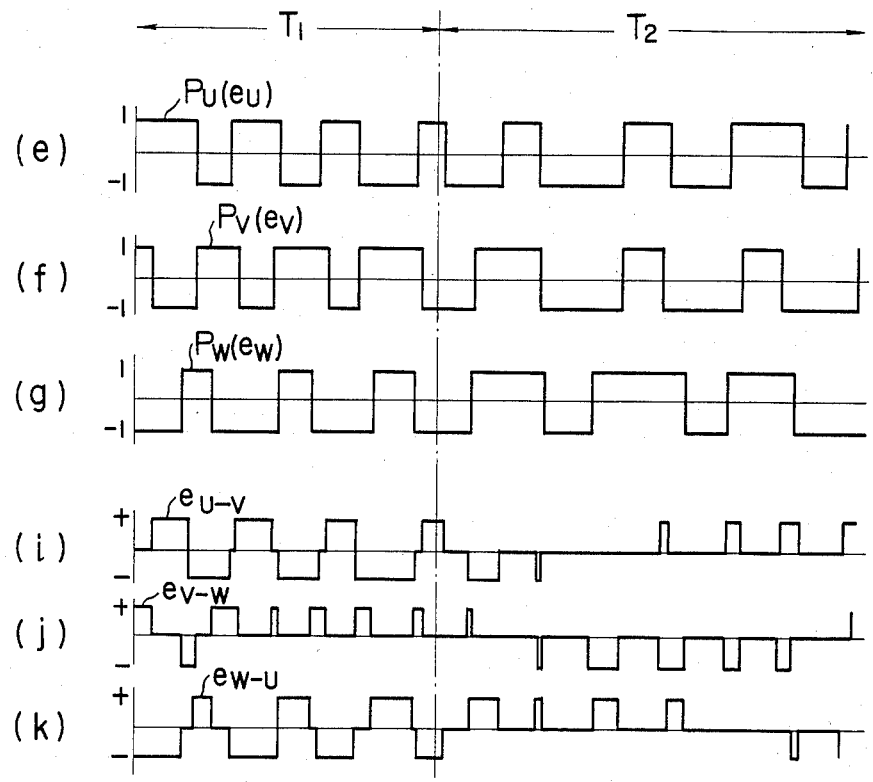

Line voltages $e_{u-v}$, $e_{v-w}$ and $e_{w-u}$ corresponding to the differences between the U-phase voltage $e_U$, V-phase voltage $e_V$ and W-phase voltage $e_W$ in the period $T_1$ shown in FIG. 2 are as shown in FIGS. 3(i), 3(j) and 3(k) respectively. As will be apparent from the fact that each of the line voltages shown in FIGS. 3(i), 3(j) and 3(k) changes in the positive and negative directions with a period shorter than that of the fundamental wave in the period $T_1$, many higher harmonic voltage components are included in these line voltages. Therefore, many higher harmonic current components flow to the induction motor 4 to increase the amount of magnetic noise.

Description will now be directed to the operation of the embodiment when the AC signal $e_C$ of triangular waveform generated from the signal generator 12 is added to the detected current signals $i_U$, $i_V$ and $i_W$. The operating waveforms when the triangular wave signal $e_C$ is added to or superposed on the detected current signals $i_U$, $i_V$ and $i_W$ are shown in the period $T_2$ of FIGS. 2 and 3.

The triangular wave signal $e_C$ having a waveform as shown in FIG. 2(d) is added to the detected current signals $i_U$, $i_V$ and $i_W$ in the adders 9U, 9V and 9W respectively. The signals $i_{OU}$, $i_{OV}$ and $i_{OW}$ obtained by addition of the triangular wave signal $e_C$ to the detected current signals $i_U$, $i_V$ and $i_W$ are applied from the adders 9U, 9V and 9W to the comparators 10U, 10V and 10W to be compared with the current command pattern signals $i_U^*$, $i_V^*$ and $i_W^*$ respectively. The comparators 10U, 10V and 10W act to turn the PWM pulse signals $p_U$, $P_V$ and $P_W$ from the "1" level to the "−1" level when the following relation holds:

$$i - i^* \geq \Delta I - e_C \qquad (1)$$

On the other hand, the PWM pulse signals $P_U$, $P_V$ and $P_W$ are turned from the "−1" level to the "1" level when the following relation holds:

$$i - i^* \leq -\Delta I - e_C \qquad (2)$$

The comparators 10U, 10V and 10W generate such PWM pulse signals $P_U$, $P_V$ and $P_W$ on the basis of the magnitude and polarity of current errors $\Delta i_U$, $\Delta i_V$ and $\Delta i_W$ between the current command pattern signals $i_U^*$, $i_V^*$, $i_W^*$ and the sum signals $i_{OU}$, $i_{OV}$, $i_{OW}$ respectively. Therefore, as will be apparent from the expressions (1) and (2), addition of the triangular wave signal $e_C$ to the detected current signals $i_U$, $i_V$ and $i_W$ is equivalent to changing of the hysteresis deviations $\pm\Delta I$ of the comparators 10U, 10V and 10W by the triangular wave signal $e_C$. The waveforms representing the results of addition of the triangular wave signal $e_C$ to the current command pattern signals $i_U^*$, $i_V^*$ and $i_W^*$ are quite complex when illustrated. In the period $T_2$ in FIG. 2, therefore, the waveforms representing the changed hysteresis deviations $\pm\Delta I$ are merely shown to avoid complexity.

Addition of the triangular wave signal $e_C$ to the current command pattern signals $i_U^*$, $i_V^*$ and $i_W^*$ is equivalent to changing of the hysteresis deviations $\pm\Delta I$ of the comparators 10U, 10V and 10W as shown by the one-dot chain curves in FIGS. 2(a), 2(b) and 2(c). In the period $T_2$, the comparators 10U, 10V and 10W operate in a manner as described already to generate PWM pulse signals $P_U$, $P_V$ and $P_W$ having waveforms as shown in FIGS. 2(e), 2(f) and 2(g) respectively. Line voltages $e_{U-V}$, $e_{V-W}$ and $e_{W-U}$ as shown in FIGS. 3(i), 3(j) and 3(k) respectively are obtained when such PWM pulse signals $P_U$, $P_V$ and $P_W$ are applied for the turn-on control of the PWM inverter 3 in the period $T_2$. It will be seen that the line voltages (the effective values) obtained in the period $T_2$ as a result of the addition of the triangular wave signal $e_C$ to the detected current signals $i_U$, $i_V$ and $i_W$ decrease compared with those appearing in the period $T_1$, and positive or negative voltages appear in synchronism with the period of the fundamental wave. This proves the fact that the fundamental wave component of the line voltages remains unchanged, and the higher harmonic voltage components are decreased. Since the higher harmonic voltage components are decreased, the higher harmonic current components supplied to the induction motor 4 are also decreased thereby reducing undesirable magnetic noise.

It will be seen from the above description that undesirable magnetic noise can be reduced by the addition of the triangular wave signal $e_C$ to the detected current signals $i_U$, $i_V$ and $i_W$. In this case, the voltage $e_N$ at the neutral point has a waveform as shown in FIG. 2(h). It will be seen in FIG. 2(h) that the effective value of the neutral voltage $e_N$ in the period $T_2$ is larger than that in the period $T_1$. This means that the triangular wave signal $e_C$ is added to the detected current signals $i_U$, $i_V$ and $i_W$ in a relation which increases the effective value of the neutral voltage $e_N$. In other words, the PWM pulse signals $P_U$, $P_V$ and $P_W$ applied to the PWM inverter 3 act to increase the effective value of the neutral voltage $e_N$.

Figure 4:
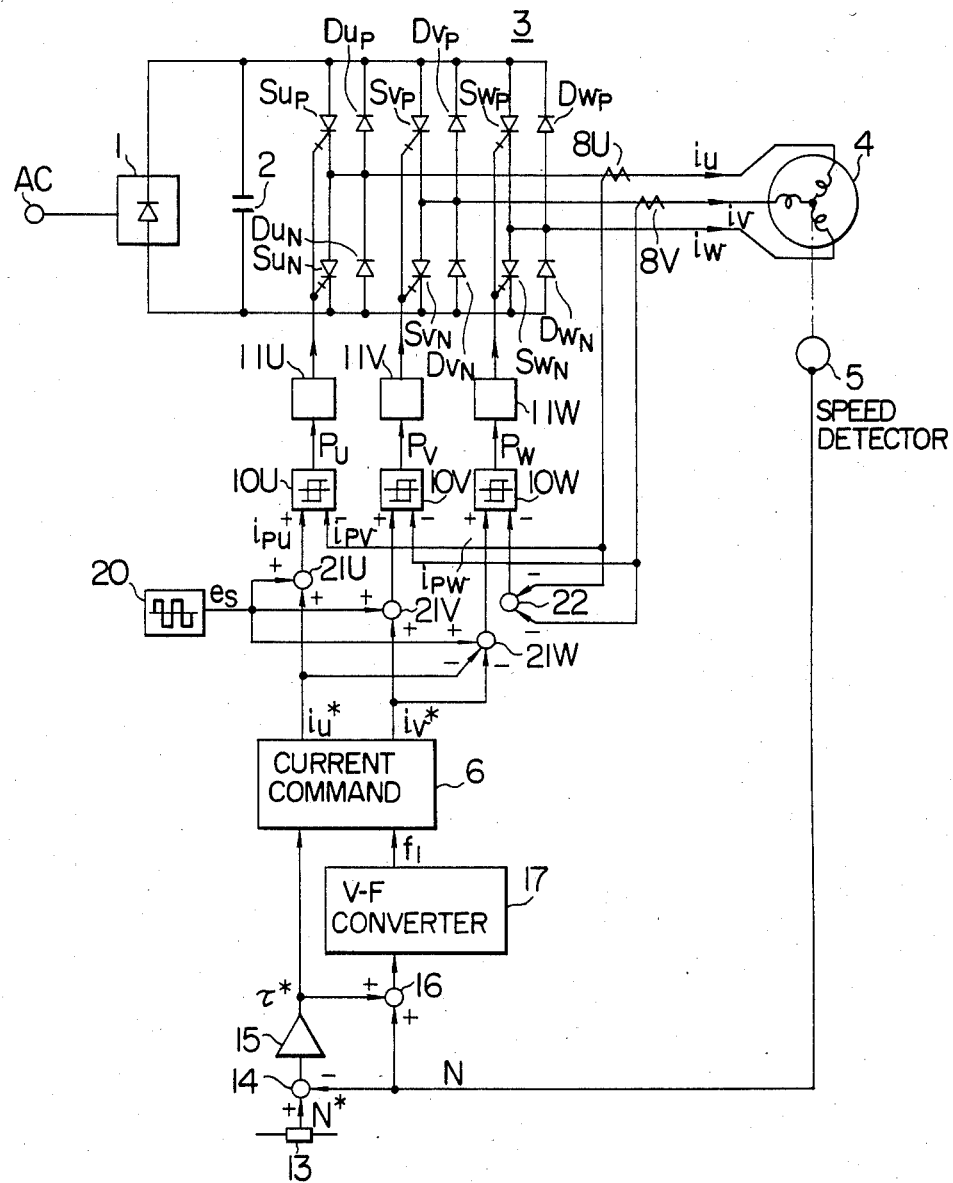
FIG. 4 is a circuit diagram showing the structure of another embodiment of the present invention.

FIG. 4 shows another embodiment of the present invention in which an AC signal (a rectangular wave signal) is superposed on current command pattern signals.

Referring to FIG. 4 in which the same reference numerals and symbols are used to designate equivalent parts appearing in FIG. 1, a signal generator 20 generates an AC signal $e_S$ of rectangular waveform which is applied to adders 21U, 21V and 21W. Current command pattern signals $i_U^*$, $i_V^*$ and $i_W^*$ from the current command circuit 6 are applied in positive polarity to the adders 21U and 21V respectively and are also applied in negative polarity to the adder 21W. The adder 21W generates a W-phase current command pattern signal $i_W^*$ which represents the vector sum of the signals $i_U^*$ and $i_V^*$. Detected current signals $i_U$ and $i_V$ from the respective current detectors 8U and 8V are applied to an adder 22, and a W-phase detected current signal $i_W$ representative of the vector sum of the signals $i_U$ and $i_V$ is generated from the adder 22.

Figure 5:
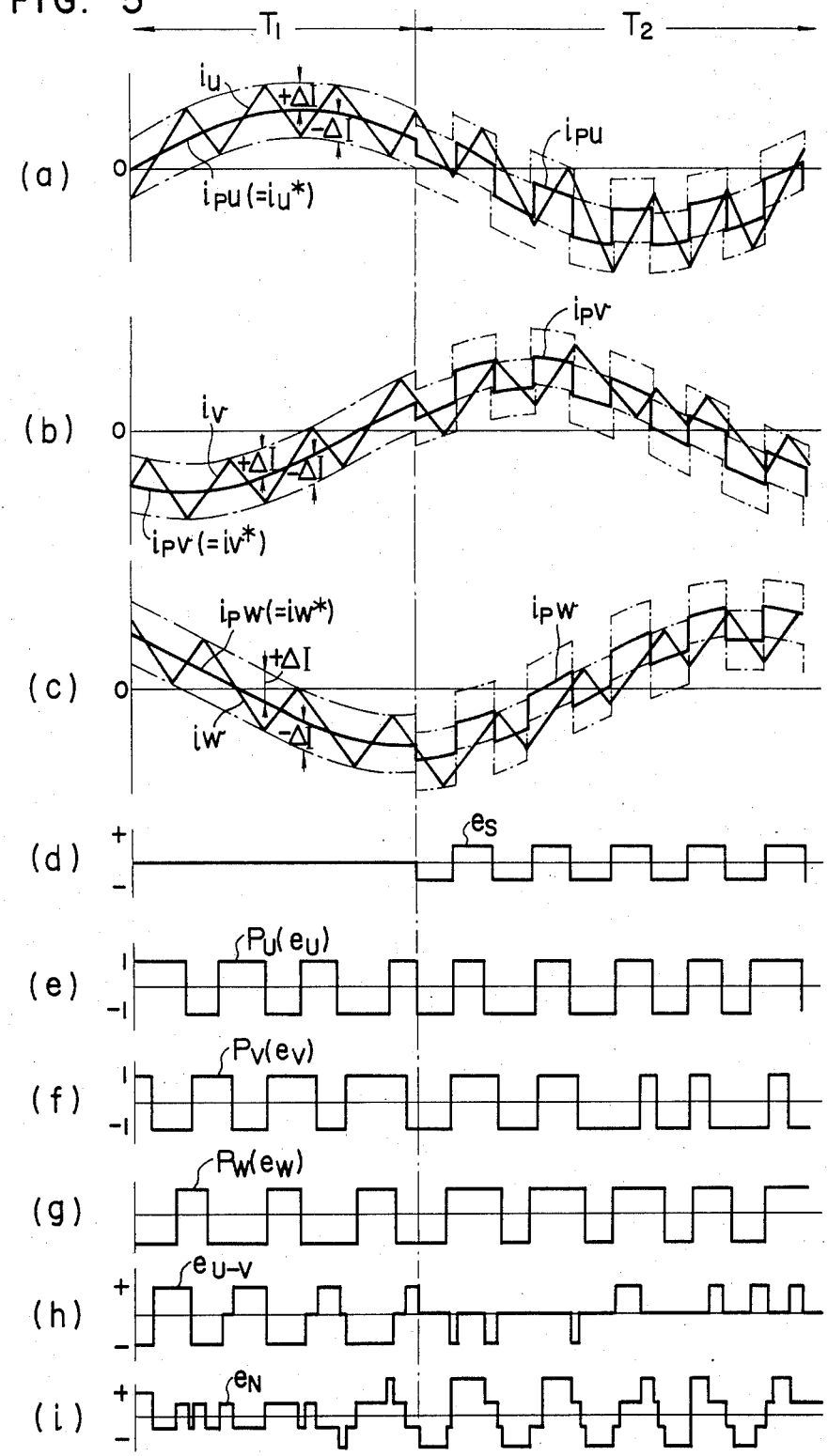
FIG. 5 is a waveform diagram illustrating the operation of the embodiment shown in FIG. 4.

The operation of the embodiment shown in FIG. 4 will be described with reference to FIG. 5 showing operating waveforms. FIG. 5(a) shows the detected current signal $i_U$ and a sum signal $i_{PU}$ applied as inputs to the comparator 10U. The sum signal $i_{PU}$ is representative of the sum of the current command pattern signal $i_U^*$ and the rectangular wave signal $e_S$ having a waveform as shown in FIG. 5(d). The comparator 10U generates a PWM pulse signal $P_U$ having a waveform as shown in FIG. 5(e). The polarity of the PWM pulse signal $P_U$ generated from the comparator 10U is inverted when the error $\Delta i_U$ of the detected current signal $i_U$ relative to the sum signal $i_{PU}$ applied from the adder 21U exceeds the hysteresis deviation $+\Delta I$ or $-\Delta I$ of the comparator 10U. The onedot chain curves in FIG. 5(a) represent the hysteresis deviations $\pm\Delta I$ of the comparator 10U. In the period $T_1$ in FIG. 5(a), the rectangular wave signal $e_S$ is not added to or superposed on the current command pattern signal $i_U^*$. The comparators 10V and 10W operate also in a manner similar to the comparator 10U and generate PWM pulse signals $P_V$ and $P_W$ having waveforms as shown in FIGS. 5(f) and 5(g) respectively.

It will be apparent from the relation between the U-phase and V-phase PWM pulse signals $P_U$ and $P_V$ (proportional to the phase voltages $e_U$ and $e_V$) shown in FIGS. 5(f) and 5(g) respectively that the effective value of the U-V line voltage $e_{U-V}$ in the period $T_1$ increases as shown in FIG. 5(h).

In the period $T_2$ in FIG. 5, the rectangular wave signal $e_S$ is applied to the adders 21U, 21V and 21W. When the rectangular wave signal $e_S$ generated from the signal generator 20 is added in the period $T_2$ to the current command pattern signals $i_U^*$, $i_V^*$ and $i_W^*$, the PWM pulse signals $P_U$, $P_V$ and $P_W$ generated from the comparators 10U, 10V and 10W have waveforms as shown in FIGS. 5(e), 5(f) and 5(g) respectively. Thus, in the period $T_2$, the U-V line voltage $e_{U-V}$ has a waveform as shown in FIG. 5(h). It will be seen in FIG. 5(h) that the effective value of the line voltage $e_{U-V}$ in the period $T_2$ is smaller than that in the period $T_1$ in which the rectangular wave signal $e_S$ is not added, and the higher harmonic voltage components are correspondingly decreased.

It will thus be seen that the embodiment shown in FIG. 4 is as effective as the embodiment shown in FIG. 1 in that the higher harmonic currents can be decreased to reduce undesirable magnetic noise. FIG. 5(i) shows the waveform of the neutral voltage $e_N$ in the embodiment shown in FIG. 4. The function of this second embodiment is the same as that of the first embodiment shown in FIG. 1 in that the rectangular wave signal $e_S$, in lieu of the triangular wave signal $e_C$, is added to the current command pattern signals $i_U^*$, $i_V^*$ and $i_W^*$ so that the PWM pulse signals $P_U$, $P_V$ and $P_W$ applied to the PWM inverter 3 act to increase the effective value of the neutral voltage $e_N$ of the inverter output voltages.

Figure 6:
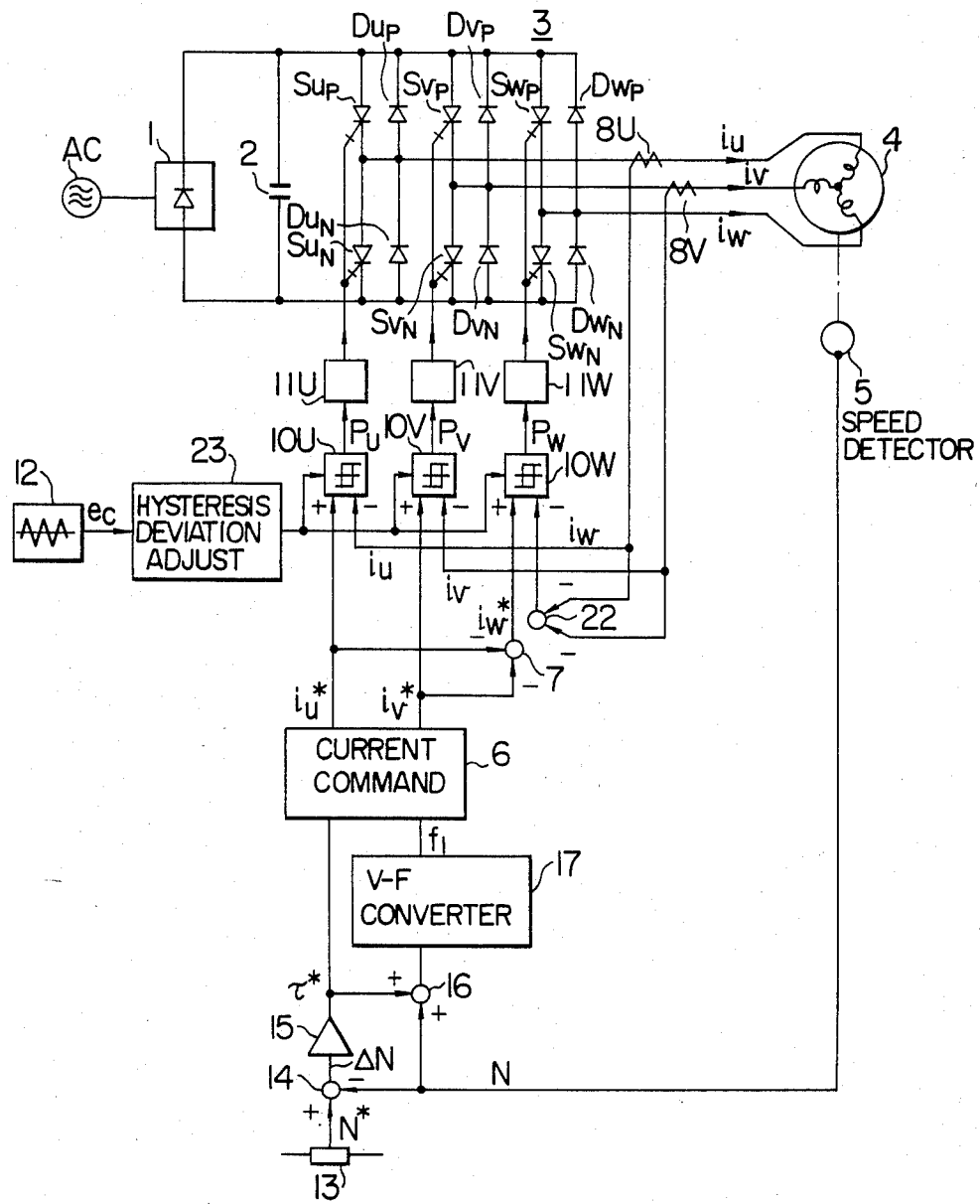
FIG. 6 is a circuit diagram showing the structure of still another embodiment of the present invention.

FIG. 6 shows still another embodiment of the present invention in which a triangular wave signal is applied to comparators so as to change the hysteresis deviations of the comparators.

Referring to FIG. 6 in which the same reference numerals and symbols are used to designate equivalent parts appearing in FIGS. 1 and 4, a hysteresis deviation adjusting circuit 23 adjusts the hysteresis deviations $\pm\Delta I$ of the comparators 10U, 10V and 10W in response to the application of a triangular wave signal $e_C$ generated from the signal generator 12.

Figure 7:
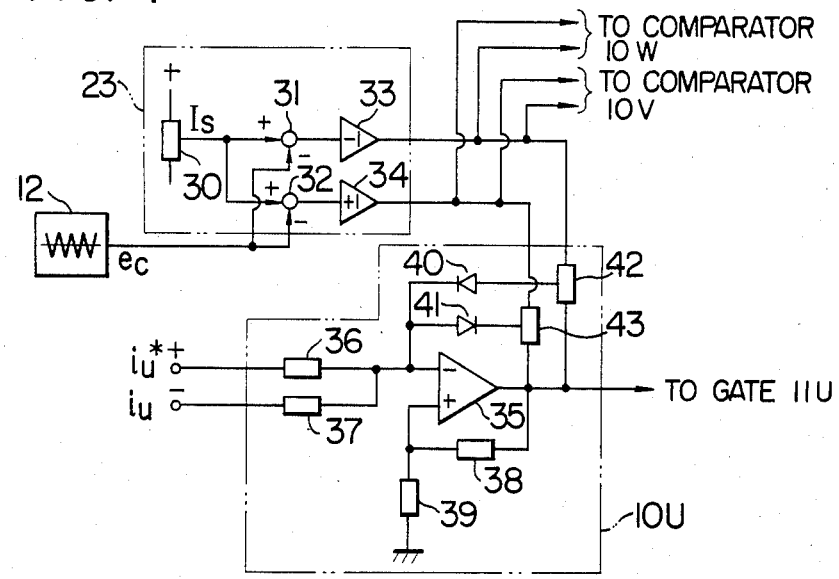
FIG. 7 is a circuit diagram showing in detail the structure of the hysteresis deviation adjusting circuit in the embodiment shown in FIG. 6.

FIG. 7 shows in detail the structure of the comparator 10U and hysteresis deviation adjusting circuit 23.

Referring to FIG. 7, a current command pattern signal $i_U^*$ and a detected current signal $i_U$ are applied through respective resistors 36 and 37 to the inverted input negative terminal of a comparing amplifier 35 in the comparator 10U. The output voltage of the comparing amplifier 35 is divided by resistors 38 and 39, and such a divided voltage signal is applied to the non-inverted input positive terminal of the comparing amplifier 35. The resistance values of these resistors 38 and 39 determine the hysteresis deviations $\pm\Delta I$ of the comparator 10U. Diodes 40 and 41 are provided for limiting the output voltage of the comparing amplifier 35, and the voltage limit can be adjusted by associated resistors 42 and 43. The parts 35 to 43 described above constitute the comparator 10U.

The hysteresis deviation adjusting circuit 23 includes a limit command circuit 30 which commands the standard limit $I_S$ of the output voltage of the comparing amplifier 35. The signal indicative of the standard limit $I_S$ is applied in illustrated polarity to adders 31 and 32 to be added to the triangular wave signal $e_C$ applied in illustrated polarity to the adders 31 and 32, and the output signals from the adders 31 and 32 are amplified by amplifiers 33 and 34 respectively. The output signals from the amplifiers 33 and 34 are applied to the associated terminals of the resistors 42 and 43 respectively. The output signals from the amplifiers 33 and 34 are applied also to the comparators 10V and 10W.

In operation, the divided voltage signal provided by dividing the output voltage of the comparing amplifier 35 by the resistors 38 and 39 is fed back to the non-inverted input positive terminal of the comparing amplifier 35, so that the comparing amplifier 35 operates with a hysteresis characteristic. The hysteresis deviations $\pm \Delta I$ can be adjusted by the level of the voltage signal fed back to the non-inverted input positive terminal of the comparing amplifier 35, and the level of the feedback voltage can be changed by the amplitude of the output voltage of the comparing amplifier 35. The diodes 40, 41 and the resistors 42, 43 constitute a known limiter circuit so that the limit is variable depending on the levels of the output voltages of the amplifiers 33 and 34. More concretely, the diode 41 is turned on when the comparing amplifier 35 generates a negative voltage which exceeds a predetermined value in relation to the output voltage of the amplifier 34 applied through the resistor 43. Consequently, the absolute value of the output voltage (negative) of the comparing amplifier 35 decreases, and the output voltage of the comparing amplifier 35 is limited to a value corresponding to the output voltage of the amplifier 34. Similarly, the positive output voltage of the comparing amplifier 35 is limited by the function of the diode 40 to a value corresponding to the output voltage of the amplifier 33.

When the triangular wave signal $e_C$ generated from the signal generator 12 is not applied to the hysteresis deviation adjusting circuit 23, the output voltages of the amplifiers 33 and 34 have constant values proportional to the standard limit $I_S$. Therefore, the hysteresis deviations $\pm \Delta I$ of the comparing amplifier 35 are also constant.

Then, when the triangular wave signal $e_C$ generated from the signal generator 12 is applied to the adders 31 and 32, the output voltages of the amplifiers 33 and 34 change in synchronism with the triangular wave signal $e_C$. Since the output voltage of the comparing amplifier 35 is limited by the output voltages of the amplifiers 33 and 34, the hysteresis deviations $\pm \Delta I$ change in synchronism with the triangular wave signal $e_C$.

Thus, by changing the hysteresis deviations $\pm \Delta I$ of the comparators 10U, 10V and 10W in synchronism with the triangular wave signal $e_C$, the line voltages can be decreased to reduce undesirable magnetic noise generated from the induction motor 4, as in the case of the embodiment shown in FIG. 1.

Figure 8:
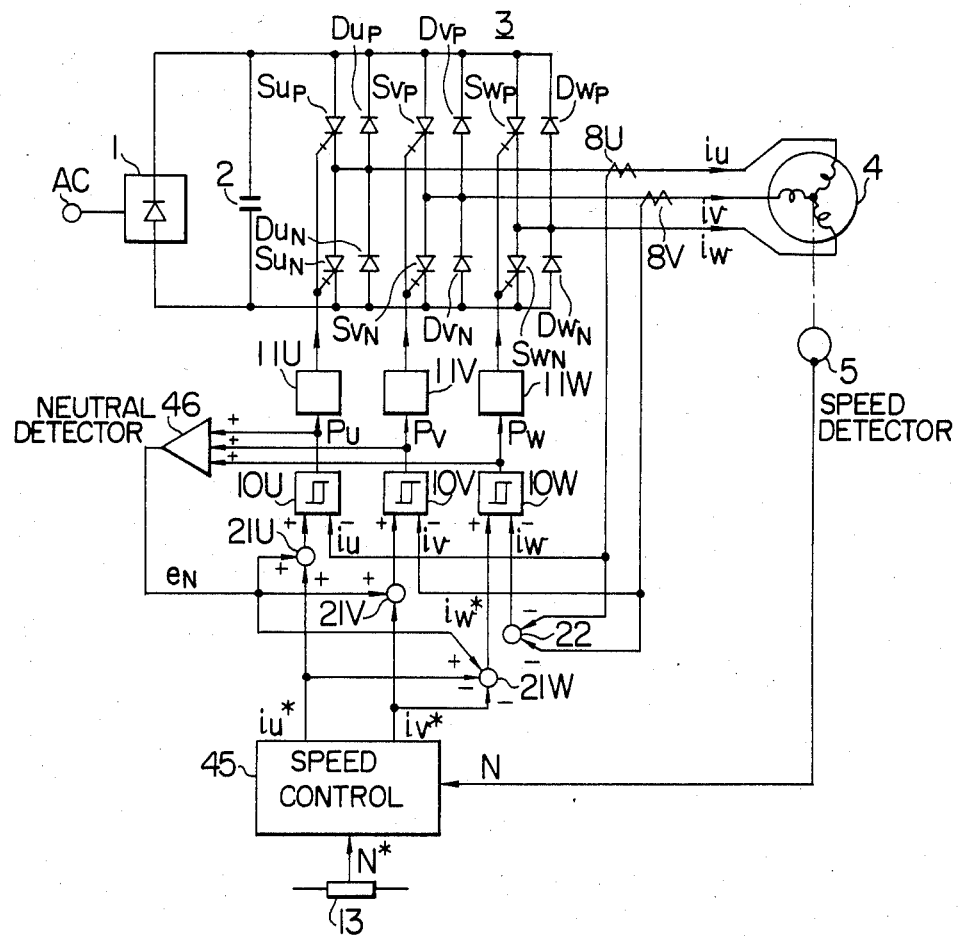
FIG. 8 is a circuit diagram showing the structure of yet another embodiment of the present invention.

FIG. 8 shows yet another embodiment of the present invention in which a voltage signal indicative of the voltage at the neutral point of the primary windings of an induction motor is added to current command pattern signals $i_U^*$, $i_V^*$ and $i_W^*$.

Referring to FIG. 8 in which the same reference numerals and symbols are used to designate equivalent parts appearing in FIGS. 1 and 4, a speed control circuit 45 includes the combination of the current command circuit 6, the comparator 14, the speed error amplifier 15, the adder 16 and the V-F converter 17 shown in FIG. 1. A neutral voltage detection circuit 46 generates a neutral voltage signal $e_N$ which represents the sum of PWM pulse signals $P_U$, $P_V$ and $P_W$ applied from the comparators 10U, 10V and 10W thereto in illustrated polarity and which is applied to the adders 21U, 21V and 21W in illustrated polarity.

Figure 9:
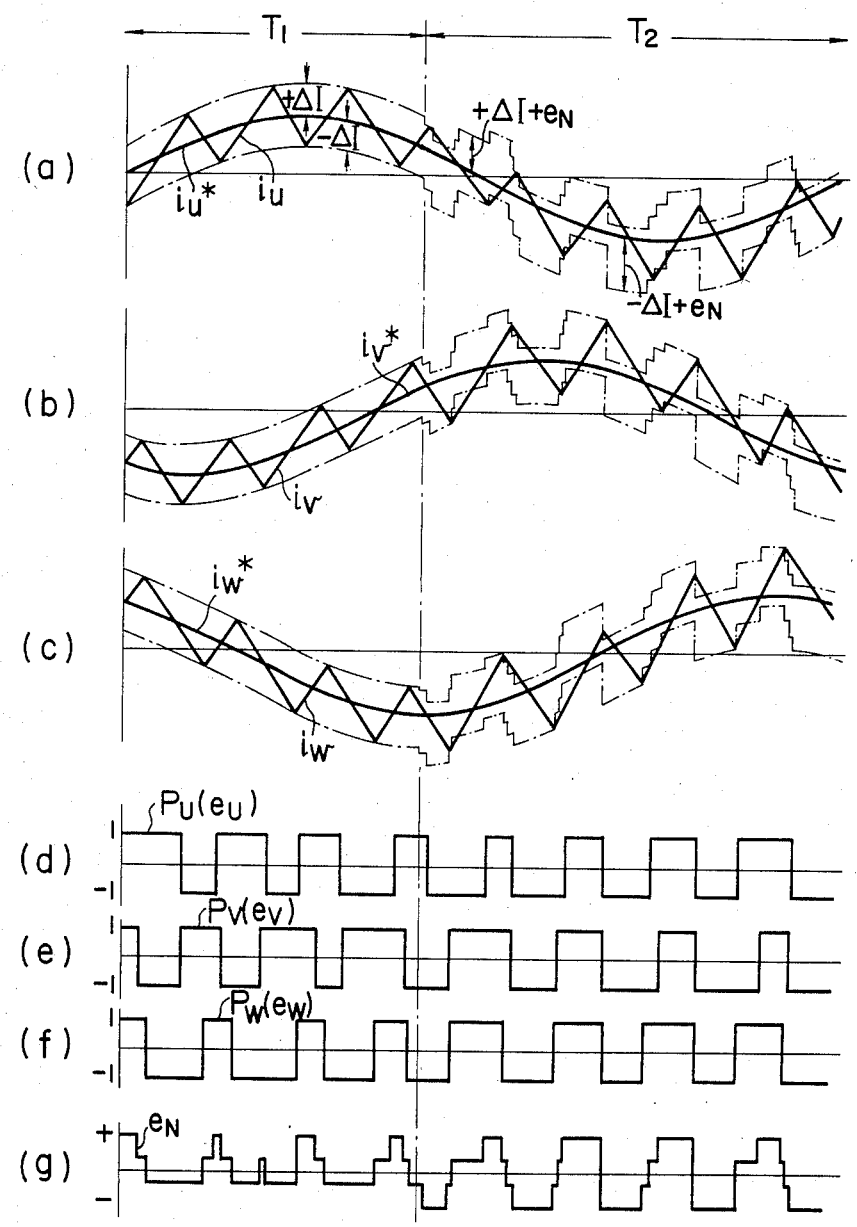
FIGS. 9 and 10 are waveform diagrams illustrating the operation of the embodiment shown in FIG. 8.
Figure 10:
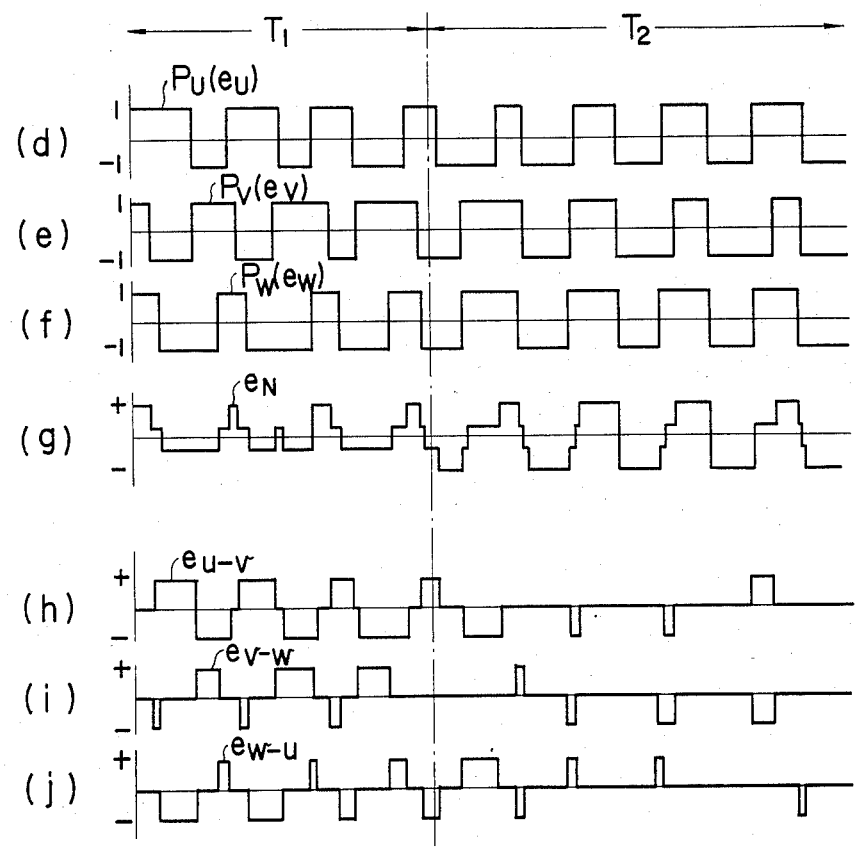

FIGS. 9 and 10 show operating waveforms of the embodiment shown in FIG. 8. The signals shown in FIGS. 9(d) to 9(g) are the same as those shown in FIGS. 10(d) to 10(g) respectively.

In a period $T_1$ in FIGS. 9 and 10, the neutral voltage signal $e_N$ is not applied to the adders 21U, 21V and 21W from the neutral voltage detection circuit 46, while, in another period $T_2$, the signal $e_N$ is applied to the adders 21U, 21V and 21W.

FIGS. 9(a), 9(b) and 9(c) show the relation between current command pattern signals $i_U^*$, $i_V^*$ and $i_W^*$ and U-phase, V-phase and W-phase detected current signals $i_U$, $i_V$ and $i_W$ respectively. FIGS. 9(d), 9(e) and 9(f) show the waveforms of the PWM pulse signals $P_U$, $P_V$ and $P_W$ generated from the comparators 10U, 10V and 10W respectively. The PWM inverter 3 is on-off controlled by the PWM pulse signals $P_U$, $P_V$ and $P_W$ applied through the gate circuits 11U, 11V and 11W from the comparators 10U, 10V and 10W respectively, and, in this case, the voltage signal $e_N$ indicative of the voltage at the neutral point of the primary windings of the induction motor 4 has a waveform as shown in FIG. 9(g). Also, line voltages $e_{U-V}$, $e_{V-W}$ and $e_{W-U}$ have waveforms as shown in FIGS. 10(h), 10(i) and 10(j) respectively.

The operation of the embodiment shown in FIG. 8 is similar to that of the embodiment shown in FIG. 1. Although the neutral voltage signal $e_N$ is added to the current command pattern signals $i_U^*$, $i_V^*$ and $i_W^*$ in FIG. 8, FIGS. 9(a), 9(b) and 9(c) illustrate that the hysteresis deviations $\pm \Delta I$ of the comparators 10U, 10V and 10W are changed by application of the signal $e_N$.

It will be apparent from FIGS. 9 and 10 that the line voltages $e_{U-V}$, $e_{V-W}$ and $e_{W-U}$ decrease in the period $T_2$ than in the period $T_1$ due to the application of the neutral voltage signal $e_N$ to the adders 21U, 21V and 21W in the period $T_2$. Because of the resultant decrease of higher harmonic voltage components, hence, the resultant decrease of higher harmonic current components supplied to the induction motor 4, undesirable magnetic noise can be reduced. As will be apparent from FIG. 9(g), the effective value of the neutral voltage $e_N$ is larger in the period $T_2$ than in the period $T_1$. It will thus be seen that the neutral voltage signal $e_N$ is added to the current command pattern signals $i_U^*$, $i_V^*$ and $i_W^*$ in the embodiment of FIG. 8 so that the PWM pulse signals $P_U$, $P_V$ and $P_W$ applied to the PWM inverter 3 act to increase the effective value of the neutral voltage $e_N$, as in the case of the embodiment shown in FIG. 1.

Although the neutral voltage signal $e_N$ is added to the current command pattern signals $i^*$ in the embodiment shown in FIG. 8, the operation is also the same when the signal $e_N$ is added to the detected current signals i in the same polarity. Also, the hysteresis deviations $\pm \Delta I$ of the comparators 10U, 10V and 10W may be directly changed by application of the neutral voltage signal $e_N$, as in the case of the embodiment shown in FIG. 6. This is readily apparent from the expressions (1) and (2).

Further, although the neutral voltage signal $e_N$ is provided by the sum of the U-phase, V-phase and W-phase PWM pulse signals $P_U$, $P_V$ and $P_W$ in the embodiment of FIG. 8, it is apparent that it may be provided by the sum of the detected U-phase, V-phase and W-phase output voltages of the PWM inverter 3 or it may be detected from the neutral point of the primary windings of the induction motor 4.

Figure 11:
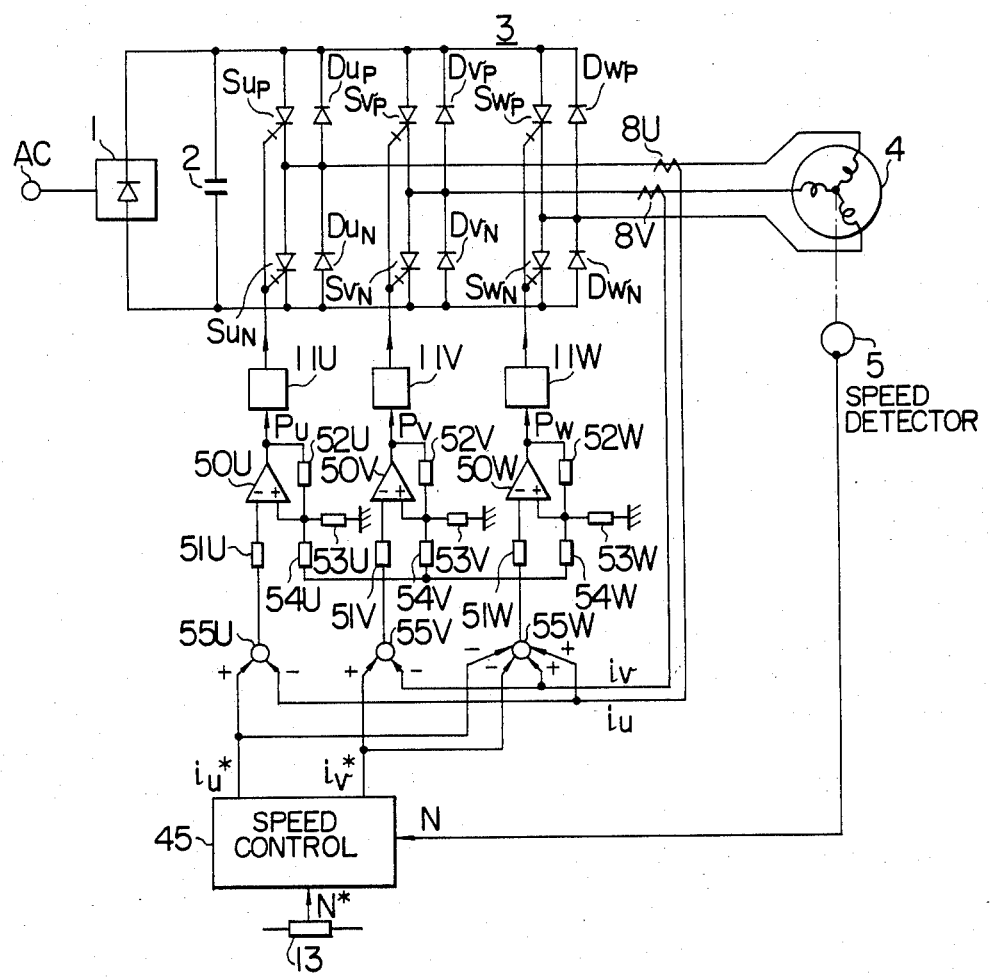
FIG. 11 is a circuit diagram showing the structure of a further embodiment of the present invention.

FIG. 11 shows a further embodiment of the present invention in which the neutral voltage signal $e_N$ is applied directly to the positive input terminals of comparing amplifiers constituting the individual comparators 10U, 10V and 10W.

Referring to FIG. 11 in which the same reference numerals and symbols are used to designate equivalent parts appearing in FIG. 8, adders 55U, 55V and 55W generate output signals indicative of U-phase, V-phase and W-phase current errors $\Delta i_U$, $\Delta i_V$ and $\Delta i_W$ respectively in response to the application of current command pattern signals $i_U^*$, $i_V^*$ and detected current signals $i_U$, $i_V$. The signals indicative of the U-phase, V-phase and W-phase current errors $\Delta i_U$, $\Delta i_V$ and $\Delta i_W$ are applied through input resistors 51U, 51V and 51W to the negative input terminals of comparing amplifiers 50U, 50V and 50W respectively. PWM pulse signals $P_U$, $P_V$ and $P_W$ (proportional to phase voltages $e_U$, $e_V$ and $e_W$) generated from the comparing amplifiers 50U, 50V and 50W are voltage-divided by feedback resistors 52U, 53U; 52V, 53V; and 52W, 53W, and such divided voltage signals are fed back to the positive input terminals of the comparing amplifiers 50U, 50V and 50W respectively. The comparing amplifiers 50 and the resistors 51, 52, 53 constitute the comparators 10 having the hysteresis characteristic. The hysteresis deviations $\pm \Delta I$ of each of these comparators 10 are determined by the ratio between the resistance values of the associated resistors 52 and 53. The hysteresis deviations $\pm \Delta I$ of each of the comparators 10 become larger with the increase of the feedback voltage applied to its positive input terminal. The positive input terminals of the U-phase, V-phase and W-phase comparing amplifiers 50U, 50V and 50W are interconnected through resistors 54U, 54V and 54W respectively.

In the embodiment of FIG. 11 having the structure above described, the feedback voltage $e_f$ applied to the positive input terminal of each of the comparing amplifiers 50 can be expressed by the following equation (3):

$$e_f = \frac{1}{\frac{1}{R_1} + \frac{2}{R_2} + \frac{3}{R_3}} \left( \frac{e_o}{R_1} + \frac{1}{3R_3\left(1 + \frac{R_1}{R_2}\right)} e_N \right) \quad (3)$$

where
- $R_1$: resistance value of resistors 52U, 52V and 52W
- $R_2$: resistance value of resistors 53U, 53V and 53W
- $R_3$: resistance value of resistors 54U, 54V and 54W
- $e_o$: output voltage of comparing amplifiers 50U, 50V and 50W, proportional to phase voltages $e_U$, $e_V$ and $e_W$
- $e_N$: sum of output voltages of comparing amplifiers 50U, 50V and 50W, corresponding to neutral voltage of PWM inverter output voltages The first term in the parentheses on the right-hand side of the equation (3) represents the value of the output voltage signal $e_o$ of the comparing amplifier 50, and the second term represents the value of the neutral voltage signal $e_N$. The output voltage signal $e_o$ of the comparing amplifier 50 is a binary signal having either a positive polarity or a negative polarity, and the application of such a signal $e_o$ to the positive input terminal of the comparing amplifier 50 provides the hysteresis characteristic. Further, by the application of the neutral voltage signal $e_N$ to the positive input terminal of the comparing amplifier 50, the embodiment of FIG. 11 operates in a manner similar to that of the embodiment of FIG. 8 to exhibit the effect of magnetic noise reduction.

In the embodiment shown in FIG. 11, the positive input terminals of the comparing amplifiers 50U, 50V and 50W are interconnected through the resistors 54U, 54V and 54W. However, the positive input terminals of the comparing amplifiers 50U, 50V and 50W may be directly interconnected to exhibit substantially the same effect. In such a case, the feedback voltage $e_f$ applied to the positive input terminal of the comparing amplifier 50 is expressed as follows:

$$e_f = \frac{1}{3\left(1 + \frac{R_1}{R_2}\right)} e_N \quad (4)$$

The feedback voltage $e_f$ given by the equation (4) is proportional to the neutral voltage $e_N$ only, and the hysteresis characteristic provided in relation to the voltage $e_o$ disappears. However, in this case too, the comparing amplifiers 50U, 50V and 50W can satisfactorily operate to generate the required PWM pulse signals $P_U$, $P_V$ and $P_W$. This arrangement can achieve the desired function without increasing the number of resistors.

According to the embodiments of the present invention described in detail hereinbefore, an AC signal such as a triangular wave signal, a rectangular wave signal, a sinusoidal wave signal or a neutral voltage signal is applied in common to U-phase, V-phase and W-phase comparators a hysteresis characteristic and which have generate PWM pulse signals for the purpose of turn-on control of a PWM inverter, so that these PWM pulse signals act to increase the effective value of the neutral voltage thereby reducing undesirable magnetic noise.

Figure 12:
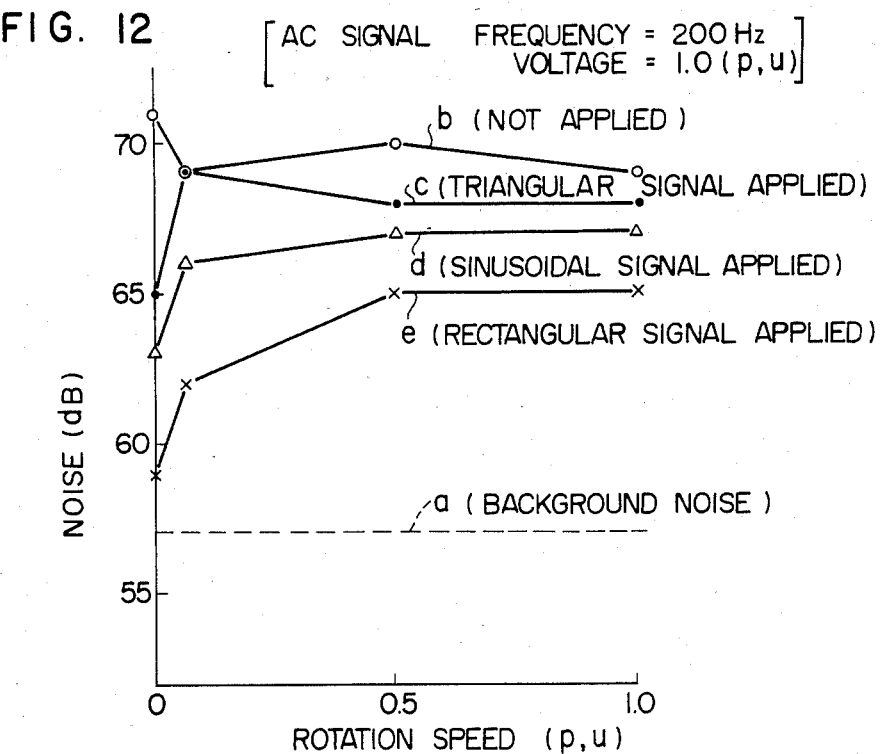
FIGS. 12 to 14 are graphs showing experimental results for illustrating the effect of the present invention.
Figure 13:
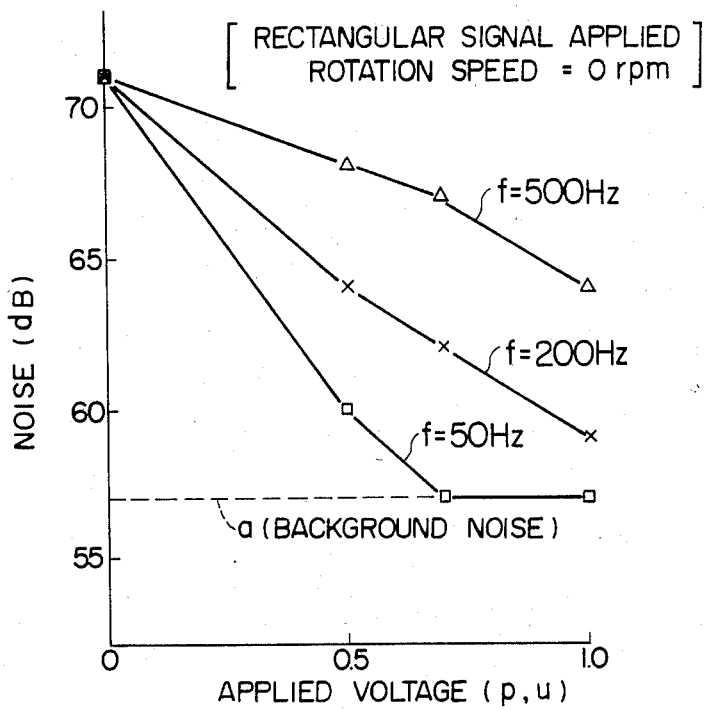
Figure 14:
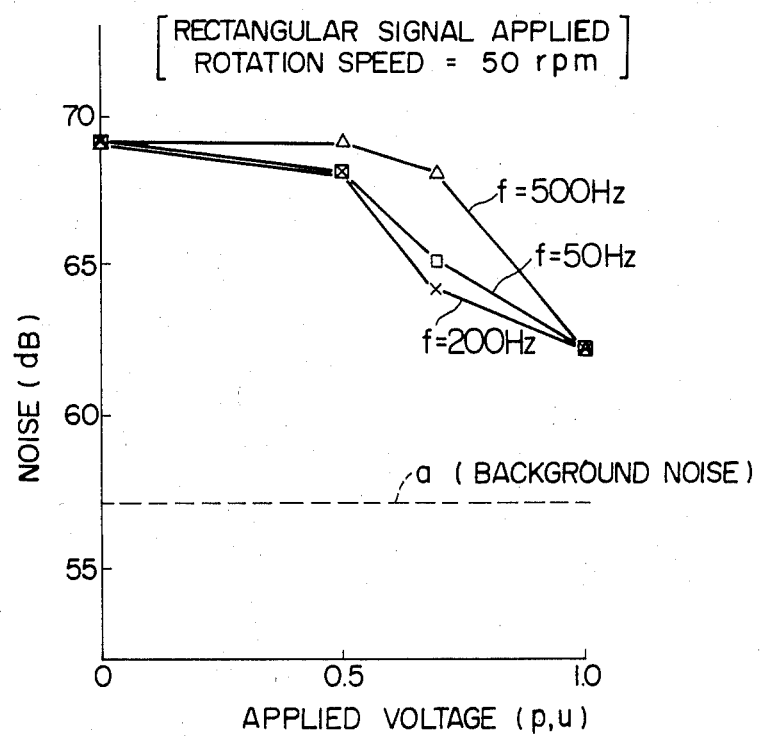

FIGS. 12 to 14 are graphs showing experimental results for illustrating the effect of the present invention. An induction motor having a capacity of 5.5 kW was used in the experiments.

FIG. 12 is a graph showing the relation between the rotation speed of the induction motor and noise when an AC signal of 200 Hz was applied.

The broken line a in FIG. 12 represents the level of background noise, and the curve b represents the relation between the motor rotation speed and noise in the absence of the AC signal. The curves c, d and e represent the same relations when a triangular wave signal, a sinusoidal wave signal and a rectangular wave signal are applied as the AC signal respectively. It will be apparent from FIG. 12 that the noise level is generally reduced by application of the AC signal and, especially, the noise level can be greatly reduced at low rotation speeds of the induction motor.

FIGS. 13 and 14 are graphs showing the relation between the voltage of the AC signal and noise when a rectangular wave signal was applied as the AC signal and its frequency was set at 50 Hz, 200 Hz and 500 Hz. In FIG. 13, the rotation speed of the induction motor is 0 rpm, and, in FIG. 14, the rotation speed is 50 rpm. It will be seen from FIGS. 13 and 14 that the higher the voltage of the applied AC signal, the lower is the noise level, and the lower the frequency of the applied AC signal, the greater is the effect of noise reduction when the AC voltage is the same.

It will be understood from the foregoing detailed description of the present invention that an AC signal is applied in common to U-phase, V-phase and W-phase comparators which have a hysteresis characteristic and generate PWM pulse signals for the purpose of turn-on control of a PWM inverter, so that these PWM pulse signals act to increase the effective value of the neutral voltage of the PWM inverter output voltages, whereby magnetic noise generated from an AC motor driven by the PWM inverter can be reduced regardless of the load, and the desired current control with a high response can be achieved.

While embodiments including analog elements are described by way of example, it is apparent that the present invention is equally effectively applicable to a method and apparatus in which a digital processing unit such as a microprocessor is used for the digital control.

Further, in the embodiments of the present invention, the AC signal may be applied to the U-phase, V-phase and W-phase comparators only when the induction motor rotates at low speeds where generation of magnetic noise therefrom is not ignorable.

We claim:

1. A PWM inverter control method comprising the steps of:
    driving a polyphase AC motor with a PWM inverter;
    generating current command pattern signals for commanding output currents for individual phases of the PWM inverter;
    detecting output currents for the individual phases of the PWM inverter and providing output current signals indicative thereof;
    generating PWM pulse signals in a pulse width modulation means according to the magnitude and polarity of current errors between the current command pattern signals and the output current signals for the individual phase;
    generating a neutral voltage signal indicative of a neutral voltage of the output of the PWM inverter; and
    applying the neutral voltage signal to the pulse width modulation means so that the neutral voltage signal is added to the current errors for the individual phases.

2. A PWM inverter control method according to claim 1, wherein the step of generating the neutral voltage includes the step of adding the PWM pulse signals for the individual phases to provide the neutral voltage signal.

3. A PWM inverter control apparatus comprising:
    a PWM inverter for driving a polyphase AC motor;
    current command means for generating current command pattern signals for command output currents for individual phases of said PWM inverter;
    current detection means for detecting output currents for the individual phases of said PWM inverter and providing output current signals indicative thereof;
    pulse width modulation means for generating PWM pulse signals according to the magnitude and polarity of current errors between the current command pattern signals and the output current signals of said current detection means for the individual phases; and
    signal generating means for generating a neutral voltage signal indicative of a neutral voltage of the output of said PWM inverter, said signal generating means applying said neutral voltage signal to said pulse width modulation means so that said neutral voltage signal is added to said current errors for the individual phases.

4. A PWM inverter control apparatus according to claim 3, wehrein said signal generating means generates said neutral voltage by adding said PWM pulse signals for the individual phase.

5. A PWM inverter control apparatus comprising;
    a PWM inverter driving a polyphase AC motor;
    current command means for generating current command pattern signals for commanding output currents of said PWM inverter in individual phases;
    current detection means for detecting output currents for the individual phases of said PWM inverter and providing output current signals indicative thereof;
    comparison means having a hysteresis characteristic for generating PWM pulse signals according to the magnitude and polarity of current errors between the current command pattern signals and the output current signals detected by said current detecting means for the individual phases;
    signal generating means for generating a neutral voltage signal indicative of a neutral voltage of the output of said PWM inverter; and
    hysteresis deviation adjusting means responsive to said neutral voltage signal for adjusting hysteresis deviations of the hysteresis characteristic of said comparison means on the basis of said neutral voltage signal.

6. A PWM inverter control apparatus according to claim 5, wherein said signal generating means generates said neutral voltage signal by adding said PWM pulse signals for the individual phases.

7. A PWM inverter control method according to claim 1, wherein the step of generating the neutral voltage signal includes detecting the output voltages of the PWM inverter for the individual phases thereof and adding the detected output voltages for the individual phases to provide the neutral voltage signal.

8. A PWM inverter control method according to claim 1, wherein the step of generating the neutral voltage signal includes the step of detecting the neutral voltage from the neutral point of the primary windings of the AC motor as the neutral voltage signal.

* * * * *